Patented Apr. 28, 1953

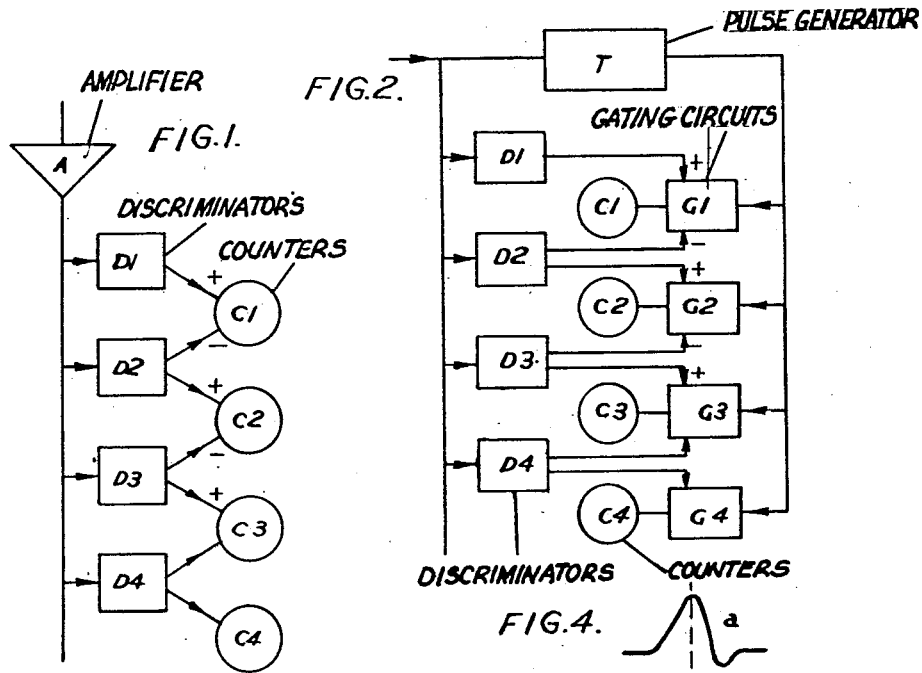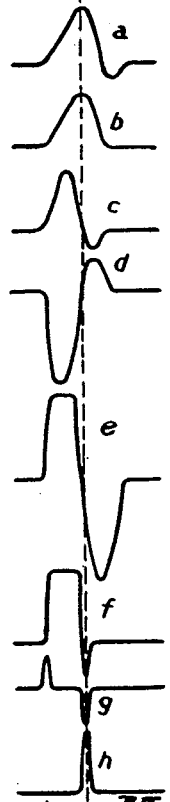

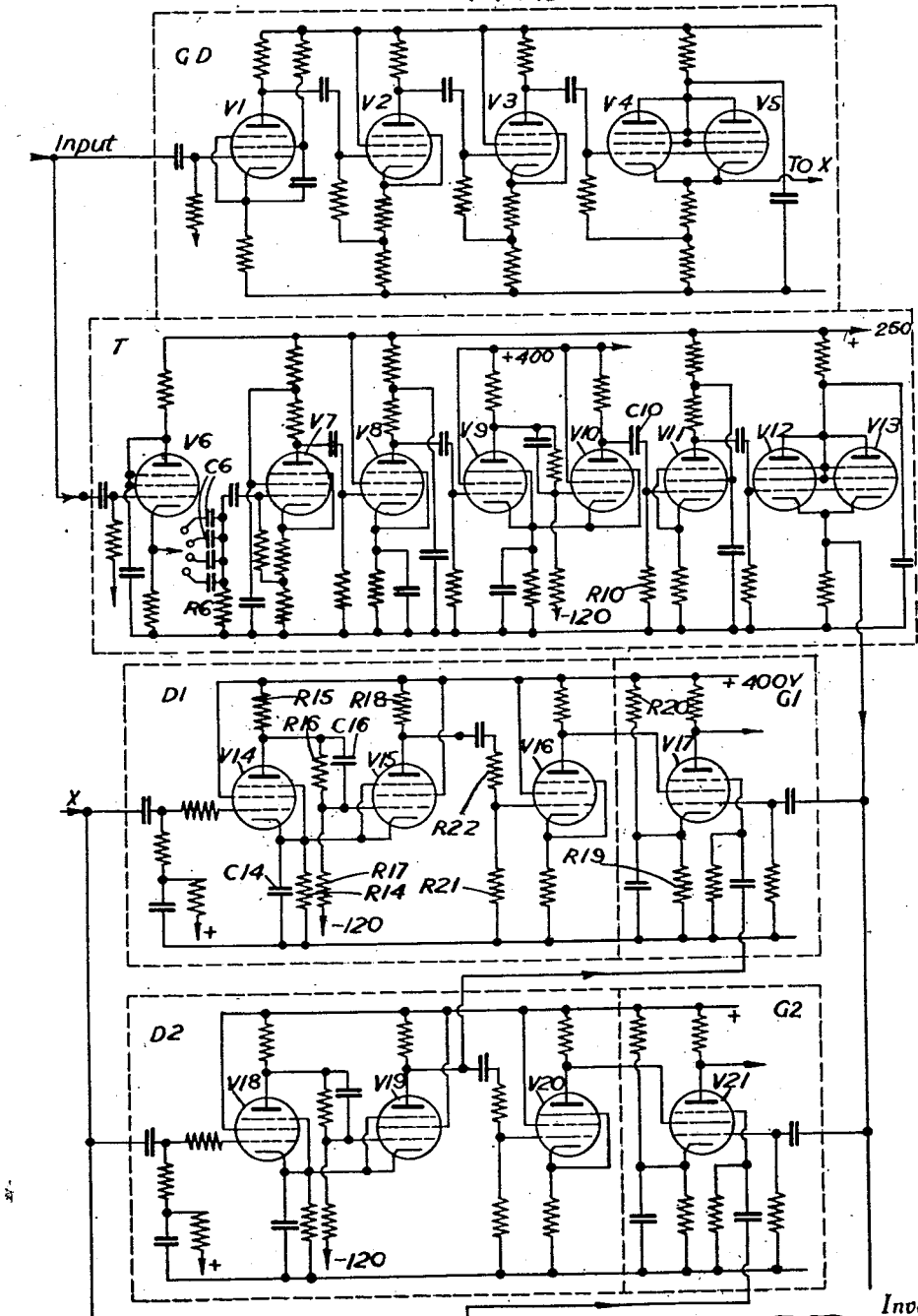

2,636,983

UNITED STATES PATENT OFFICE 2,636,983

PULSE ANALYZER

Michael J. Poole, London, England, assignor, by mesne assignments, to National Research Development Corporation, London, England, a corporation of Great Britain Application May 20, 1948, Serial No. 28,122
In Great Britain June 14, 1947

8 Claims. (Cl. 250—27)

This invention relates to pulse analysers for classifying the pulses of a train into groups of different amplitude ranges.

One known method of analysing a pulse train, such as the amplified pulses from an ionisation chamber subject to particle bombardment, is to photograph the pulse train in a recording oscillograph and subsequently to measure the individual pulses. This method suffers from the disadvantage that the analysing process is a long and tedious one, particularly if a high statistical accuracy is required and in the case of a mechanical oscillograph it is limited to counting speeds of a few hundred per minute.

The invention will be described with reference to the accompanying drawings wherein—

Fig. 1 is a block diagram of a known form of pulse analyser;

Fig. 2 is a block diagram of a pulse analyser embodying the invention;

Figs. 3 and 4 are wave form diagrams; and

Fig. 5 is a circuit diagram of my embodiment of the invention.

Another method is to employ electronic means to distribute the pulses according to their amplitude. They may then be counted automatically or otherwise utilised. A known pulse analyser based on this method is shown diagrammatically in Fig. 1 of the accompanying drawings. In this figure D1, D2, D3, D4 represent discriminators or relays of graded back bias to all of which the pulse series to be analysed is applied through an amplifier A providing a suitable initial amplitude level. Counters C are associated with successive pairs of discriminators to count only if the first discriminator of the pair has responded to a pulse while the second of the pair has not. If for example, discriminators D1, D2, D3, D4 have bias voltages of 0, 10, 20, 30 respectively and operate to apply a negative pulse to the preceding counter and a positive pulse to the succeeding counter, all output pulses being equal, then on the arrival of a 23 volt pulse from amplifier A discriminators D1, D2, D3 operate to apply to their counters pulses of sign as indicated in the figure but discriminator D4 does not operate; the pulses on C1 and C2 neutralise each other so that C3 alone is excited to count that particular pulse from amplifier A. It will thus be seen that, in the example referred to, counter C1 registers pulses in the voltage range 0 to 10, C2 registers pulses in the voltage range 10 to 20 and so on.

Arrangements of the above-mentioned kind give rise to difficulties because the pulses from the discriminators are not coincident, this tendency being due to the finite rising time of the input pulse.

In accordance with the present invention there is derived from the initial pulse series a train of shorter pulses of greater uniformity in amplitude and waveform and these derived pulses are distributed to counters or other output channels according to the amplitudes of the corresponding initial pulses.

The distribution may be effected by means of discriminating electronic switches or gate circuits controlled by the initial pulse series.

Referring to Fig. 2 derived short pulses are applied to electronic switches or gating circuits G1, G2, G3, G4 the opening and closing of which are controlled by discriminators D1, D2, D3, D4. These discriminators of graded back-bias have the initial input pulses applied to them and when one of them is excited by a pulse of sufficient amplitude it tends to make the preceding gate circuit inoperative and the succeeding gate circuit operative to pass the short pulse to the corresponding counter.

The discriminators and gates circuits thus function to make a path for each derived short pulse to reach its appropriate counter and to block the paths to other counters.

One convenient form of gate circuit is comprised by a thermionic valve having three grids, to the second of which the preceding discriminator applies a positive pulse tending to accelerate electrons to the anode and to the third of which the succeeding discriminator applies a negative blocking pulse. Current through the valve is normally blocked by a negative bias on the first grid so that the discriminator pulses are not passed to the counter.

Thus if D1, D2 and D3 only are excited, the gate valves in G1 and G2 are cut off by pulses on their third grids, the gate valve in G4 has an ineffective second grid voltage since no pulse arrives from D4 while the gate valve in G3 is given second and third grid voltages suitable for current flow through it. No current does flow however, until the short derived pulse arrives to overcome the blocking bias on the first grid. Thus it will be seen that the discriminators have effect to prepare the path to the counters but not themselves to excite the counters.

In Fig. 3 idealised pulse forms are shown of an initial input pulse series, and of the consequent pulses at the electrodes of a gate valve such as that described above. A first discriminator D1 is assumed to have a back-bias of 10 volts and to be excited by the second and third pulses; a second discriminator D2 is assumed to have a back bias of 15 volts and to be excited by the third pulse. Short derived pulses arriving at the first grid are shown at $V_{g1}$. Discriminator D1 applies positive pulses $V_{g2}$ to the second or screen grid; D2 applied a negative pulse $V_{g3}$ to the third grid. Under these conditions the valve is operative only during the second short pulse and the resulting anode voltage is as shown at $V_A$.

Fig. 5 is a circuit diagram of a pulse analyser of the general form of Fig. 2 and includes a pulse generator T for deriving short pulses, discriminators D1 and D2 including phase reversing valves V16 and V20 for providing positive pulse outputs, and gate circuits G1 and G2. Succeeding discriminators and gate circuits are not shown but are similar to D1, D2 and G1, G2 respectively.

There is also preferably included a grouping discriminator GD to the input of which the initial pulse train to be analysed is applied and from which any desired part of the amplitude range may be abstracted and applied as input to the discriminators D1, D2 etc. In the absence of such a grouping discriminator, the initial pulse train is applied directly in appropriate sense to the discriminators D1, D2 etc.

Before it is possible to explain the counting circuits used in this particular pulse analyser it is necessary to understand the working of the discriminators employed and these are therefore described in detail first. They are a modification of the Schmitt thermionic trigger (Journ. of Scientific Instruments, 15, 24, 1938) which basically comprises two valves like V14, V15 in Fig. 5 with a common cathode resistance R14, an output resistance network R15, R16, R17 for valve V14 with a direct coupling to valve V15, and an anode load resistance R18 for valve V15.

Normally the grid of V14 is maintained at a positive potential sufficient to cause V15 to be cut off. Now suppose the grid potential of V14 falls until V15 starts to take current. Then the system will become unstable when the total gain round the loop formed by the grid and cathode couplings of the valve exceeds unity. The current through V15 then suddenly increases to a value determined entirely by its cathode resistor R14 and grid potential, while V14 cuts off. This state is stable as long as the grid of V14 does not rise above another critical potential at which V14 again conducts. The two critical potentials (on and off) are separated by an "overlap" or "backlash" voltage of anything from a fraction of a volt to a few volts depending on circuit conditions. As will be seen later this effect is very valuable in the working of the discriminator.

The adopted circuit of the discriminator differs from the basic Schmitt trigger circuit by the addition of a grid condenser C16 in shunt to the coupling resistance R16 and a condenser C14 across the common cathode resistor R14. The former serves to improve the gain at high frequencies and so speed up the trigger action, while the latter has been found experimentally to increase the speed of the initial fall of output potential (though slowing the rise later) and as will be seen later the successful operation of the counting circuits depends on this fall being fast.

An important point in the design of a practical pulse analyser is the stability of the voltage at which each discriminator fires. This depends largely on the stability of the values of resistances R15, R16 and R17 (which are preferably on this account wire-wound), and on the stability of the supply voltages. It is noteworthy that if the positive bias and the H. T. voltages are derived from the same source partial compensation of voltages variations takes place and effectively only variations in the cut-off bias are observed.

These discriminators have a measured resolving time of from 5 to 10 sec., and in virtue of the "overlap" in the two critical voltages are insensitive to noise superimposed on the pulse as long as the peak-to-peak noise voltage does not exceed the overlap voltage. This overlap voltage serves the additional purpose of ensuring a finite output pulse even when the discriminator is only just triggered by the peak of the impulse. The output voltage amplitude of the discriminator when connected to the following circuits is about 20 volts. The discriminators D1, D2, etc. are coupled to the gating valves V17, V21 etc. of gate circuits G1, G2 etc., so that when a discriminator (say D2) fires it passes a negative pulse to the suppressor of the gating valve V17 immediately before it in the sequence, and a positive pulse to the screen of the gating valve V21 immediately following it. These discriminator pulses alone will not cause any of the valves V17, V21 etc. to give an output pulse as they each have a large negative bias on the control grid. Accordingly a sharp positive pulse from trigger unit T is applied to the control grids of all the gating valves at a moment when the pulses from all the discriminators overlap. This will cause a pulse of current to flow through that gating valve whose screen voltage has risen, but which has not had a negative pulse on its suppressor grid, that is the one corresponding to the last discriminator in the sequence than has fired. This is the pulse that is passed on to the counting circuits. The only time when the pulses from all the discriminators overlap is a period of about 1 $\mu$ sec. from the peak of the input pulse, and the trigger pulse is made to coincide with the peak of the input pulse. As in practice there is always a tendency for it to come a little late rather than early, this gives a pulse at the right moment. It will be seen now why it is that the fact of the "overlap" voltage making a finite length pulse, from an input pulse that just triggers the discriminator, is so important, as this is the permissible interval within which the trigger pulse may lie.

Each gate circuit G1, G2 comprising gating valve V17, V21 has its screen grid voltage determined by a phase-inverter valve V16, V20. Referring specifically to gate circuit G1, valve V17 is normally cut off by a large positive cathode bias developed across a resistance R19 and in addition its screen grid is maintained at a low voltage by the anode current taken by V16. The discriminator D1 immediately preceding the gating circuit is connected to the grid of V16 and when it fires the negative square-wave produced cuts off V16 and so allows the screen of V17 to rise to a normal working voltage. It is desirable to apply to the grid of V16 only a part of the full output from the discriminator to prevent spurious pulses from the suppressor grid of the preceding gating unit being fed to this grid at the moment of the trigger pulse. The potentiometer chain R21, R22 shown to the grid of V16 is arranged to apply the necessary cut-off voltage (4 or 5 volts) from the discriminator and this reduction of the spurious pulses eliminates the trouble. The discriminator D2 immediately following the gating valve V17 is connected directly to its suppressor grid and so, if this discriminator fires, it once again renders the gating valve insensitive.

The whole circuit arrangement of Fig. 5 is designed to use a common type of valve throughout, namely a high-slope high-frequency pentode such as type EF50. Specifically this type is used as gating valve. About 10 to 15 volts output pulse is enough to trigger the following counting circuit and the valve characteristics are such that if the gating valve normally has zero suppressor grid bias the 20 volts output from the discriminators will not be enough to render the valve insensitive unless the trigger pulse amplitude is very carefully adjusted. To get over this difficulty the suppressor grid is arranged to have a standing bias of −20 volts (and so swings from −20 to −40 volts). Under such conditions, the operation of the circuit is nearly independent of the trigger pulse amplitude provided that this is not large enough to cause grid current to flow. Rather than arrange that the control grid has a different bias from the suppressor grid (which would involve complicating a large number of units) the control grid is also given this bias and the trigger pulse is made large enough to overcome it. The bias may therefore be applied to the cathode with respect to ground and this is done by connection of the cathode to the potentiometer chain R19, R20.

As was previously mentioned the successful operation of this circuit depends on the steep initial fall of potential from the discriminators. This is to ensure that all the gating circuits have taken up their final sensitive or insensitive conditions before the arrival of the trigger pulse. It will be seen that granted this the operation of the circuit is independent of the shape of the pulses being analysed and depends on their amplitude only.

The output pulses from each of the gating valves V17, V21 etc., is fed into a scale-of-4 or scale-of-ten counting circuit operating an output valve and counting meter.

The trigger pulse applied to the control grids of the gating valves from trigger pulse generator T is a positive pulse of about 2 μ sec. duration and 30 volts amplitude, which is arranged to be initiated exactly at the moment of the peak of the input pulse. This pulse is generated by differentiating the input pulse with respect to time and making use of the fact that at the peak of the pulse the differential coefficient passes through zero. To do this the differentiated pulse is applied, after passing through suitable amplifier and limited circuits, to a Schmitt trigger identical with these in the discriminators biassed so that it "falls back" at zero input volts.

Before examining the circuit in detail it is necessary to consider the input pulses that the unit has to handle. In the present example, these will range from 3 to 100 volts in amplitude and will be, if a certain simple condition in the input amplifier is satisfied, "similar" in shape. This condition is that the collection time of the ions in the ionisation chamber or counter connected to the amplifier shall be much shorter than the "response time" of the amplifier to an instantaneous rise. The "rising time" of the pulse will then be controlled entirely by the amplifier, and the "falling time" is in any case only dependent on the coupling time constants in the amplifier. Thus the amplitude range of the differential coefficients is the same as that of the pulses.

The detailed circuit of the trigger pulse unit T, Fig. 5, will now be considered with reference to the pulse forms of Fig. 4. The input pulse form is as shown at $a$ Fig. 4. Valve V6 serves to cut off any negative "tail" of the pulse and so obviate the possibility of a second zero in the differential coefficient; the output pulse from this stage appears at the cathode of V6 as shown at $b$, Fig. 4.

A small adjustable negative bias is provided to allow suppression of amplifier noise if required. The pulse is then differentiated by the combination R6.C6 to give at the grid of valve V7 the waveform $c$, and it is found satisfactory in practice to arrange the values of R6 and C6 so that the amplitude of the differentiated pulse is $\frac{1}{30}$ to $\frac{1}{40}$ of the input pulse. As different shapes of pulses may have to be handled C6 is made variable by means of a switch. It is necessary to adjust C6 (to within a factor 2) to suit the amplifier in use. Valves V7 and V8 now serve to amplify and limit the differentiated pulse, the pulse form at the grid of valve V8 being shown at $d$ and that at the grid of valve V9 being shown at $e$ in Fig. 4. It is obviously only necessary that the amplification should be "distortionless" in the neighbourhood of zero volts, but it is quite essential that at no time should grid current flow as this will displace the moment of zero volts. The amplifier has to amplify the smallest differentiated pulse (about $\frac{1}{16}$ volt in the positive direction) up to the 5 volts required by the Schmitt trigger, without being so overloaded by the largest pulse (about 3½ volts in the positive direction) that grid current flows. This is arranged as follows. Valve V7 amplifies the pulses by a factor of 2 or 3 and also inverts them so that their largest amplitude is in the negative direction. Valve V8 has its bias adjusted so that no grid current flows with the largest pulse although it may be cut off at some part of the pulse. Bearing this condition in mind it is found possible to choose an amplification for V7 and a bias for V8 to produce a gain of up to 80 in the region of zero volts. This is sufficient to allow the smallest pulse to operate the Schmitt trigger and still give a margin of safety in case of inexact adjustment of C6. Valves V9 and V10 form the Schmitt trigger circuit and the square pulse output from valve V10 shown at $f$ in Fig. 4 is differentiated by C10.R10, the differential amplified by valve V11 and then fed on to a cathode follower formed by valves V12 and V13 in parallel to give the necessary low output impedance. The waveform at the grid of valve V11 is shown at $g$ and that at the cathodes of valves V12, V13, is shown at $h$ in Fig. 4.

The grouping discriminator GD allows any desired fraction of the pulse range of amplitudes to be selected and amplified for analysis in the circuits already described. In the unit GD, V1 is the discriminator valve and is a cathode follower cut off by a negative bias adjustable from 0 to 100 volts. Positive pulses are applied to this valve, ranging in amplitude from 3 to 100 volts. Obviously no current will flow through V1 until the instantaneous pulse amplitudes exceeds the bias, and thereafter the current, and so the change in anode potential will be almost immediately linearly proportional to the amount by which the input pulse exceeds this bias (by virtue of the cathode follower action). Any negative pulses taken off from the anode thereafter only represent that part of the input pulse which exceeds the bias. This pulse is then passed on to V2 which inverts it and limits any pulse to about 25 volts amplitude. V3 then amplifies these pulses by a factor of exactly 5, the limiting action of V2 only being necessary to prevent overloading of V3. V4 and V5 form a cathode-follower output stage to give a low output impedance. Thus if the input pulses range from 3 to 100 volts, and the group discriminator bias is B, those pulses from B to B+25 volts are represented in the output by pulses from 0 to 125 volts, of which those from 0 to 100 are handled by the analyser units. This means that input pulses from B to B+20 have been analysed into 20 groups. The factor 5 for the amplification in this discriminator was chosen to allow the total input range from 0 to 100 to be analysed into 100 groups, it was estimated that a signal to noise ratio of greater than 100:1 would be rare. Of those 100 groups, 97 or so would be realised in practice as the trigger pulse unit will not function on a pulse smaller than 3 to 4 volts.

I claim:

1. A pulse analyser comprising an input circuit for pulses to be analysed, a pulse generator connected to said input circuit to generate pulses of uniform amplitude and waveform coincident with the peaks of the input pulses to be analysed, a plurality of discriminator circuits connected to said input circuit, each of said discriminator circuits being adjusted to provide output pulses in response to the occurrence of input pulses having an amplitude greater than a given voltage, the responsive voltage of successive discriminator circuits being successively higher, a gate circuit normally non-conductive to the passage of pulses therethrough, said gate circuit having an input element together with two control elements connected respectively to the pulse output of two successive discriminator circuits to thereby be made conductive when a pulse from one discriminator is received in the absence of a pulse from the successive discriminator, means to connect the uniform pulse output from said generator means to the input element of said gate circuit, and means connected to the output of said gate circuit to indicate the passage of pulses therethrough.

2. A pulse analyser comprising an input circuit for pulses to be analysed, a pulse generator connected to said input circuit to generate pulses of uniform amplitude and waveform coincident with the peaks of the input pulses to be analysed, a plurality of discriminator circuits connected to said input circuit, each of said discriminator circuits being adjusted to provide output pulses in response to the occurrence of input pulses having an amplitude greater than a given voltage, the responsive voltage of successive discriminator circuits being successively higher, a plurality of gate circuits normally non-conductive to the passage of pulses therethrough, each of said gate circuits having an input element together with two control elements connected respectively to the pulse output of two successive discriminator circuits to thereby be made conductive when a pulse from one discriminator is received in the absence of a pulse from the successive discriminator, means to connect the uniform pulse output from said generator means to the input elements of all of said gate circuits, and means connected to the output of each of said gate circuits to indicate the passage of pulses therethrough.

3. A pulse analyser comprising an input circuit for pulses to be analysed, a pulse generator connected to said input circuit to generate pulses of uniform amplitude and waveform coincident with the peaks of the input pulses to be analysed, two of discriminator circuits connected to said input circuit, each of said discriminator circuits being adjusted to provide output pulses in response to the occurrence of input pulses having an amplitude greater than a given voltage, the responsive voltage of said discriminator circuits being at the upper and lower limits of a given voltage range, a gate circuit normally non-conductive to the passage of pulses therethrough, said gate circuit having an input element together with two control elements connected respectively to the pulse output of the two discriminator circuits to thereby be made conductive when a pulse from one discriminator is received in the absence of a pulse from the other discriminator, means to connect the uniform pulse output from said generator means to the input element of said gate circuit, and means connected to the output of said gate circuit to indicate the passage of pulses therethrough, the pulses generated by said generator and applied to the input elements of said gate circuit occurring substantially coincidental with the pulse output applied to the control elements.

4. A pulse analyzer comprising an input circuit for pulses to be analysed, a pulse generator connected to said input circuit to generate pulses of uniform amplitude and waveform coincident with the peaks of the input pulses to be analysed, a plurality of discriminator circuits connected to said input circuit, each of said discriminator circuits being adjusted to provide output pulses in response to the occurrence of input pulses having an amplitude greater than a given voltage, the responsive voltage of successive discriminator circuits being successively higher, a plurality of gate circuits normally non-conductive to the passage of pulses therethrough, each of said gate circuits having an input element together with two control elements connected respectively to the pulse output of two successive discriminator circuits to thereby be made conductive when a pulse from one discriminator is received in the absence of a pulse from the successive discriminator, means to connect the uniform pulse output from said generator means to the input elements of all of said gate circuits, and means connected to the outputs of each of said gate circuits to indicate the passage of pulses therethrough, the pulses generated by said generator and applied to the input elements of said gate circuits occurring substantially coincidental with the pulse output applied to the control elements.

5. A pulse analyser comprising an input terminal for pulses to be analysed, a pulse generator having differentiating and limiting elements and connected to said input terminal to generate pulses of uniform amplitude and waveform each coincident with the peak of a respective one of the input pulses to be analysed, a gate circuit having an input element and a control element, said gate circuit being normally non-conductive, two discriminator means connected to said input terminal and responsive to the upper and lower limits of a predetermined voltage amplitude range of the pulses to be analysed, the output of said discriminator means being connected to the control element of said gate circuit to render said gate circuit conductive upon the occurrence of pulses in the given voltage amplitude range, a connection from the output of said generator to the input element of said gate circuit, and a pulse rate counter connected to the output of said gate circuit.

6. The invention of claim 5 wherein the discriminator circuits are each comprised of a pair of vacuum tubes direct-coupled in a trigger pair circuit with a common cathode resistance.

7. A pulse analyser comprising an input circuit for pulses to be analysed, a pulse generator connected to said input circuit to generate pulses of uniform amplitude and waveform coincident with the peaks of the input pulses to be analysed, a plurality of discriminator circuits connected to said input circuit, each of said discriminator circuits being adjusted to provide output pulses in response to the occurrence of input pulses having an amplitude greater than a given voltage, the responsive voltage of successive discriminator circuits being successively higher, the output pulses of each of said discriminators being formed in simultaneous positive and negative versions, a plurality of gate circuits normally non-conductive to the passage of pulses therethrough, each of said gate circuits having an input element together with two control elements, one of said control elements being connected to the positive version of the pulse output of one discriminator and the other of said control elements being connected to the negative version of the pulse output of the succeeding discriminator circuit whereby said gate circuit is made conductive only in the presence of a positive pulse on said first control element, means to connect the uniform pulse output from said generator means to the input elements of all of said gate circuits, and means connected to the outputs of each of said gate circuits to indicate the passage of pulses therethrough.

8. A pulse analyser comprising an input terminal for pulses to be analysed, a pulse generator connected to said terminal to generate pulses of uniform amplitude and waveform each coincident with the peak of a respective input pulse, two amplitude discriminator circuits also connected at their inputs to said terminal and responsive to the upper and lower limits respectively of a predetermined voltage amplitude range of the pulses to be analysed, a gate circuit having input, control, and output connections, the outputs of the pulse generator and discriminator circuits being connected to said input and control connections respectively, and a pulse rate counter connected to said gate circuit output connection whereby uniform pulses from said generator corresponding to pulses in a predetermined amplitude range are fed to and are counted by said counter.

MICHAEL J. POOLE.

References Cited in the file of this patent
UNITED STATES PATENTS

| Number | Name | Date |
|---|---|---|
| 1,801,657 | Buyko | Apr. 21, 1931 |
| 2,008,563 | Sarbey | July 16, 1935 |
| 2,448,718 | Koulicovitch | Sept. 7, 1948 |
| 2,468,058 | Grieg | Apr. 26, 1949 |
| 2,484,352 | Miller et al. | Oct. 11, 1949 |
| 2,492,134 | Cole | Dec. 27, 1949 |
| 2,522,551 | Williams | Sept. 19, 1950 |